(12) United States Patent
Bertrand et al.

(10) Patent No.: US 12,550,355 B2
(45) Date of Patent: Feb. 10, 2026

(54) DEVICE WITH A DETECTION STRUCTURE WITH COULOMB BLOCKADE SUPERIMPOSED ON A QUANTUM DOT

(71) Applicant: COMMISSARIAT A L'ENERGIE ATOMIQUE ET AUX ENERGIES ALTERNATIVES, Paris (FR)

(72) Inventors: Benoit Bertrand, Grenoble (FR); Pierre-André Mortemousque, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/953,950

(22) Filed: Nov. 20, 2024

(65) Prior Publication Data

US 2025/0169095 A1   May 22, 2025

(51) Int. Cl.
*H10D 30/40* (2025.01)
*B82Y 10/00* (2011.01)
*G06N 10/40* (2022.01)

(52) U.S. Cl.
CPC ........... *H10D 30/402* (2025.01); *G06N 10/40* (2022.01); *B82Y 10/00* (2013.01)

(58) Field of Classification Search
CPC .............................. H10D 30/402; G06N 10/40
See application file for complete search history.

(56) References Cited

U.S. PATENT DOCUMENTS

| | | |
|---|---|---|
| 2011/0085381 A1 | 4/2011 | Ferrus |
| 2018/0331108 A1 | 11/2018 | Hutin et al. |
| 2019/0221659 A1 | 7/2019 | George et al. |
| 2020/0365656 A1 | 11/2020 | Pillarisetty et al. |
| 2021/0296556 A1* | 9/2021 | Hsu .................... H10D 48/3835 |

FOREIGN PATENT DOCUMENTS

FR       3 066 297 A1    11/2018

OTHER PUBLICATIONS

Preliminary Search Report & Written Opinion mailed Jul. 11, 2024, in corresponding French Patent Application No. FR2312781 with English translation, 13 pages.
N. Piot et al., A single hole spin with enhanced coherence in natural silicon, vol. 17; Oct. 2022; 15 pages.
Emmanuel Chanrion, et al.; Charge Detection in an Array of CMOS Quantum Dota; Aug. 24, 2020; 8 pages.
R.J. Schoelkopf et al.; The Radio-Frequency Single-Electron Transistor (RF-SET); A Fast and Ultrasensitive Electrometer; vol. 280; May 22, 1998; 5 pages.

* cited by examiner

*Primary Examiner* — Matthew L Reames
(74) *Attorney, Agent, or Firm* — Oblon, McClelland, Maier & Neustadt, L.L.P.

(57) ABSTRACT

A quantum device formed from a substrate, the substrate being covered with a semiconductor region forming a quantum dot, and a detection structure with a Coulomb blockade for detecting a state of charge of the quantum dot, the detection structure with the Coulomb blockade including a detection island disposed above and facing the quantum dot and coupled to the quantum dot by electrostatic coupling, the detection structure further including a first tunnel junction between the detection island and a first gate block, the first gate block being juxtaposed with the detection island.

21 Claims, 11 Drawing Sheets

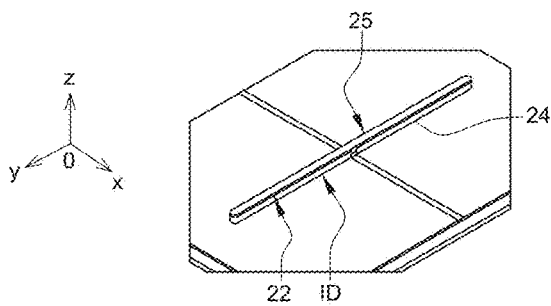
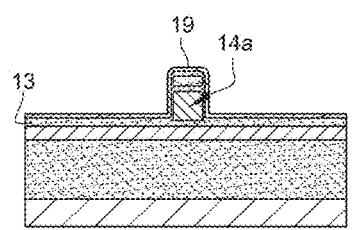
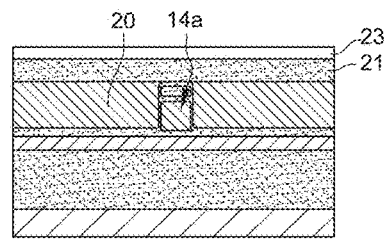
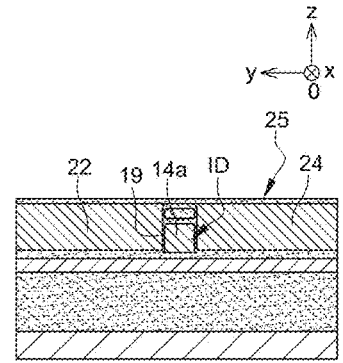
Fig. 7     Fig. 8     Fig. 9B

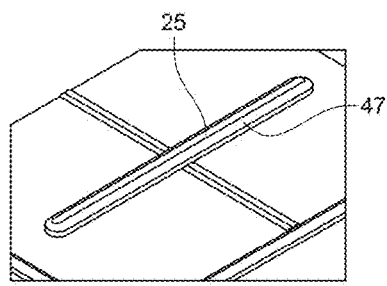
Fig. 10
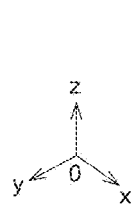
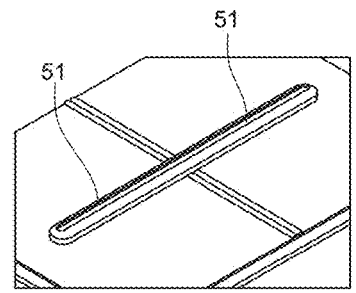
Fig. 12A
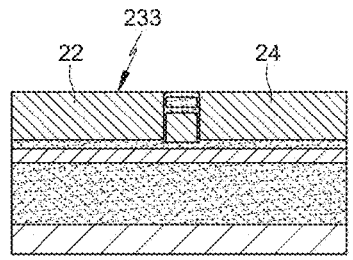
Fig. 11
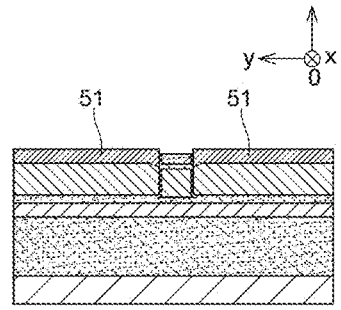
Fig. 12B

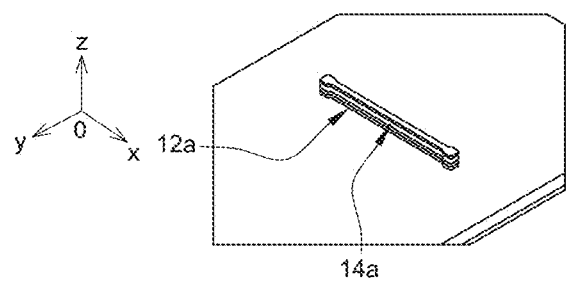
Fig. 14A
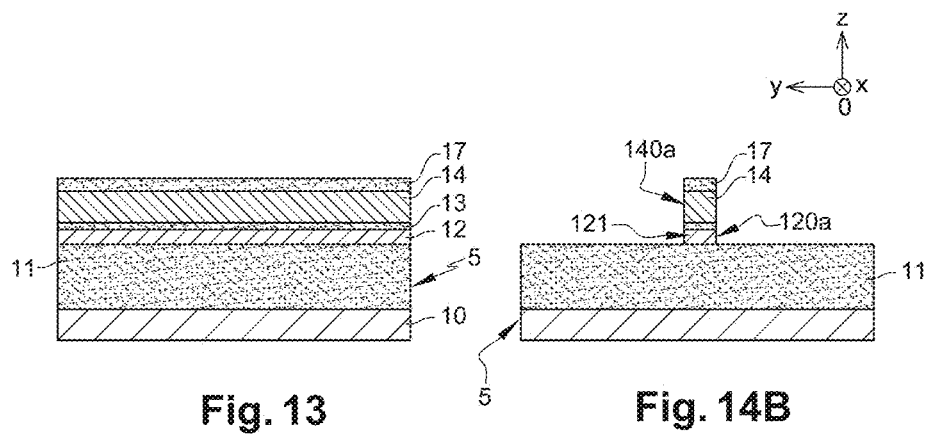
Fig. 13
Fig. 14B

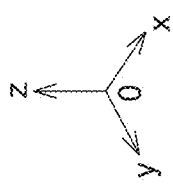
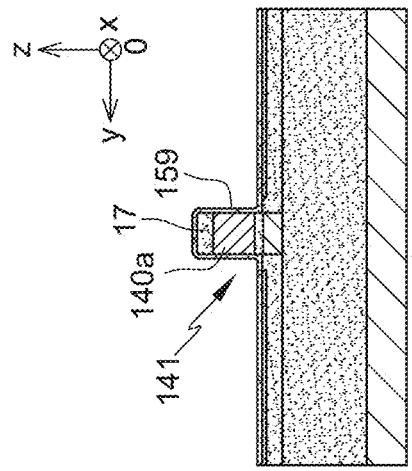
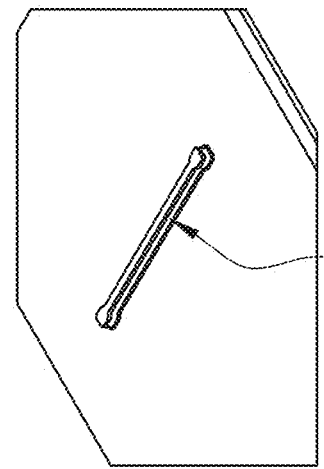
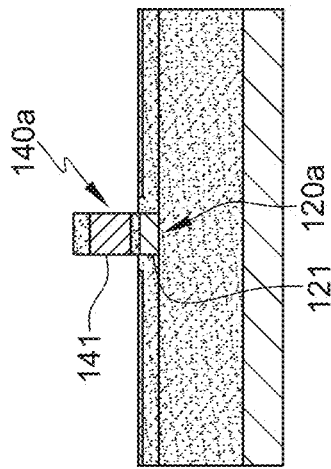
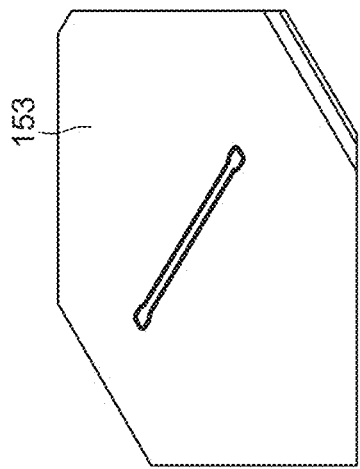
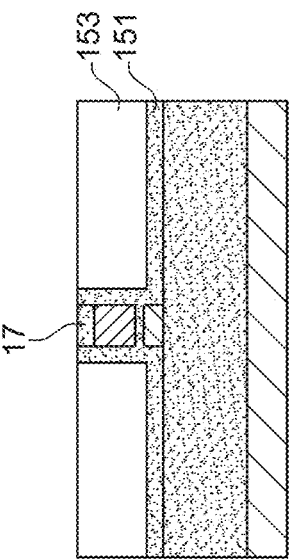

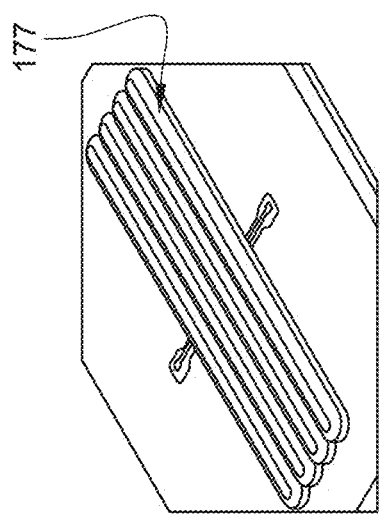
Fig. 20
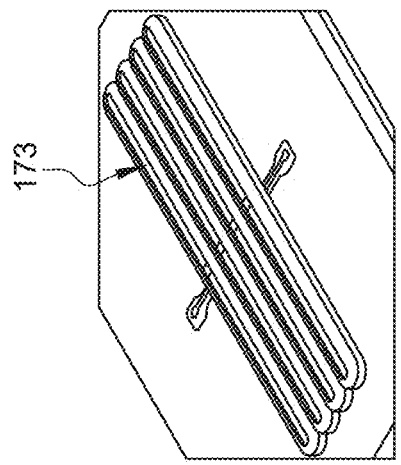
Fig. 21
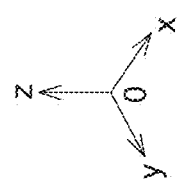
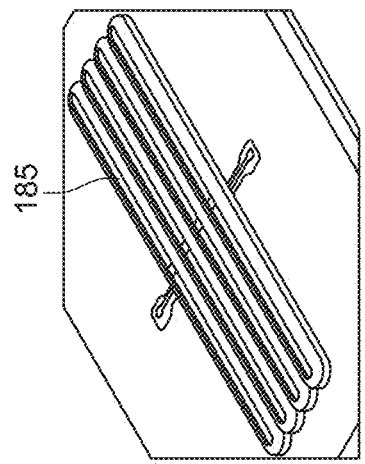
Fig. 22

DEVICE WITH A DETECTION STRUCTURE WITH COULOMB BLOCKADE SUPERIMPOSED ON A QUANTUM DOT

TECHNICAL FIELD AND PRIOR ART

The present application relates to the field of quantum devices wherein at least one bit of quantum information based on a given quantum state from at least two measurable levels is used as an information carrier. This quantum state is referred to as qubit or quantum bit.

One particular type of qubit is the spin qubit when the intrinsic degree of freedom of the spin of individual electrons is used for coding the quantum information.

Qubits can be formed in a semiconductor material in confinement structures of nanometric sizes and defined electrostatically. These confinement structures are typically referred to as "quantum dots".

A quantum dot behaves like a potential well confining one or more elementary charges (electrons or holes) in a semiconductor region.

To measure the state of a qubit, proceeding with a spin/charge conversion that makes it possible to convert the spin state of the charged particles into a state of charge of the quantum dots containing said particles is known. It is then necessary to measure this state of charge in order to deduce therefrom the spin state of the charged particles before conversion. For this purpose, a means for measuring the state of charge is in general disposed facing each quantum dot.

A qubit can in particular be read using another quantum dot referred to as a "reading island" or "detection island" coupled to that of the qubit intended to be read. These two elements form two potential wells separated by a potential barrier.

Devices wherein the detection islands and quantum dots are disposed facing and in the same plane parallel to the principal plane of a substrate on which the detection islands and quantum dots are formed are known.

They pose problems of space requirements. Moreover, because of manufacturing constraints of such devices, the possibilities of bringing the detection structure and the quantum dot close together are limited, which can be detrimental to the detection sensitivity.

The document FR 3066297, from the applicant, provides for a quantum device wherein, according to one embodiment, the detection structure can be located in a plane distinct from the plane of the quantum dots. Electrostatic control gates are provided between a level in which the quantum dots are formed and a level in which the charge detectors are provided. Such a device poses a problem in terms of complexity of implementation of the method for manufacturing same.

A problem is posed of producing a quantum device improved with respect to at least one of the drawbacks mentioned above.

DESCRIPTION OF THE INVENTION

According to one aspect, the present invention relates to a quantum device formed from a substrate covered:
with at least one semiconductor region wherein a quantum dot is able to be formed,
at least one gate block for modulating the potential of the quantum dots and forming a reservoir of charges,
a detection structure for detecting a state of charge of said quantum dot, said detection structure including a detection island disposed above and facing the quantum dot and able to be coupled to the quantum dot by electrostatic coupling, said detection structure furthermore including at least one first tunnel junction between said detection island and the first gate block, the first gate block being juxtaposed with said detection island.

The semiconductor region is typically located at a first level of the device, in other words in a first plane parallel to a principal plane of the substrate, while the first gate block and the detection structure are arranged in a second level, in other words in a second plane parallel to a principal plane of the substrate.

Such an arrangement with a quantum dot and detection island superimposed makes it possible to confer a reduced imprint in the plane and to implement a close-together arrangement of the detection island with regard to the quantum dot, which makes it possible to be able to establish good capacitive coupling between the detection island and the quantum dot and thus to perfect the sensitivity of detection. Such an arrangement of the aforementioned elements also makes it possible to make integration in a matrix provided with one or more rows of quantum dots and associated detection structures easier.

According to a first embodiment of the quantum device and of the detection structure, a second gate block distinct from the first gate block and located in the same first plane as the first gate block and the detection island, the first plane being parallel to a principal plane of the substrate, the second gate block being arranged so that the detection island is disposed between the first gate block and the second gate block, the charge detection structure being provided with a second tunnel junction formed between the detection island and the second gate block.

With such an arrangement, a detection of the state of charge of the quantum dot can be implemented by suitably biasing the first block and the second gate block so as to pass a current through the tunnel junctions. The current level then gives information about the state of charge of the quantum dot.

To make contact on the first gate block, a first contact pad can be provided on this first gate block.

Likewise, to make contact on the second gate block, a second contact pad can also be provided on this second gate block.

According to one possibility of implementation, the detection island can be based on the same semiconductor material or doped semiconductor material as the gate block or blocks.

Advantageously, the first contact pad and the second contact pad are provided, respectively, for:
during a so-called "detection" operating phase, applying respectively a first potential to the first gate block and a second potential to the second gate block different from the first potential so as to allow passage of a current through said first and second junctions, and
during at least one other operating phase distinct from said detection operating phase: applying one and the same given potential to the first gate block and to the second gate block.

Applying the same given potential makes it possible to prevent circulation of the current, which may prove detrimental during the operation of the qubits, and to mitigate the problems of local heating of the device and of charging noise generated in proximity to the quantum dot, which would be liable to disturb the state of the qubits during the operations.

Advantageously, the device may further be provided with a stage for measuring the current through said first junction and second junction coupled to the first contact pad and to the second contact pad.

According to a second embodiment of the quantum device, the device can further include a first contact pad on the first gate block, the first contact pad being coupled to a circuit of a refractometry measuring device, said circuit being in particular configured to:
- emit an RF signal on the first contact pad intended for said detection island;
- detect a variation in the phase and/or amplitude of the RF signal reflected by said island following said emission.

Advantageously, whether for the first embodiment or the second embodiment, the device can be provided with a conductive pad for electrostatic control of said detection island, said conductive pad being disposed above and facing said detection island and separated from said detection island by means of at least one dielectric region so as to allow electrostatic coupling between said conductive pad and said detection island.

According to a particular embodiment of the device, the conductive pad can be disposed in contact with a region of conductive or semiconductor material separated from the detection island by means of the dielectric region, said detection island being based on the same material as said region of conductive or semiconductor material.

Advantageously, the conductive pad is disposed in contact with a region of doped conductive or semiconductor material separated from the detection island by means of a dielectric region, said region of doped conductive or semiconductor material, said dielectric region and said detection island having the same imprint and forming the same pattern.

According to another aspect, the present invention relates to a method for manufacturing a quantum device as defined above.

According to another aspect, the present invention relates to a method for manufacturing a quantum device comprising the following steps:
- providing a substrate covered with at least one semiconductor layer, at least one region of said semiconductor layer being able to form a quantum dot,
- forming a bar based on at least one conductive or semiconductor material wherein at least one detection island facing said quantum dot is provided,
- forming at least one tunnel dielectric region on at least one lateral side of said bar,
- forming one or more gate blocks juxtaposed with said bar and extending mainly in a direction orthogonal to a principal direction in which said bar extends, at least one first gate block from said gate blocks being disposed against the tunnel dielectric region arranged on said detection island, so as to form a tunnel junction between the first gate block and the detection island.

Advantageously, said one or more gate blocks can be formed by:
- depositing at least one gate material, then:
- etching said gate material, said etching being implemented concomitantly with an etching of the bar to form the detection island.

According to a particular embodiment, said bar can be based on said gate material.

Advantageously, the tunnel dielectric region can be formed by depositing a tunnel dielectric layer on the bar and then by etching the tunnel dielectric layer, the etching of the tunnel dielectric layer and the etching of said bar to form the detection island and the etching of said gate material being implemented using one and the same masking.

In a variant, the tunnel dielectric region can be formed by oxidising said bar.

According to one possibility of implementation, the bar is called the "upper bar" and is formed by depositing a conductive material and then etching the conductive material using a masking, said etching of the conductive material being extended into the semiconductor layer so as to form another bar referred to as the "lower" bar and advantageously reproducing the form of the upper bar.

Advantageously, at the end of said etching to form the lower bar, lateral sides of the lower bar are revealed. The method can then further comprise: after forming said lower bar and prior to the formation of said tunnel dielectric region, steps of:
- depositing one or more insulating layers,
- etching said one or more insulating layers so as to form insulating protective blocks on either side of the lateral faces of the semiconductor region,
- forming a tunnel dielectric region by depositing a tunnel dielectric layer on the upper bar while lateral sides of the lower bar are protected.

BRIEF DESCRIPTION OF THE DRAWINGS

The present invention will be better understood upon reading the description of embodiments given, merely as indicative and non-limiting example, with reference to the appended drawings wherein:

FIGS. 7, 8, 9A and 9B illustrate an implementation of a plurality of electrostatic control gates of a quantum island and of definition by concomitant etching to produce this quantum island and these gates.

FIGS. 10, 11, 12A and 12B illustrate the optional implementation of a siliciding of the top of the gate blocks when the latter are semiconductors.

FIGS. 13 to 22 illustrate another example of a method for manufacturing a quantum device as implemented according to the present invention.

Identical, similar or equivalent parts in the different figures described hereinafter bear the same reference numerals so as to make it easier to switch from one figure to another.

Furthermore, in the following description, terms that depend on the orientation of the structure such as "above", "below", "rear", "front", "upper" and "lower" apply by considering that the structure is oriented as illustrated on the figures.

The different portions shown in the figures are not necessarily plotted according to a uniform scale, to make the figures more readable.

The different possibilities (variants and embodiments) should be understood as not being exclusive of one another and may be combined together.

DETAILED DESCRIPTION OF PARTICULAR EMBODIMENTS

Figure 1:
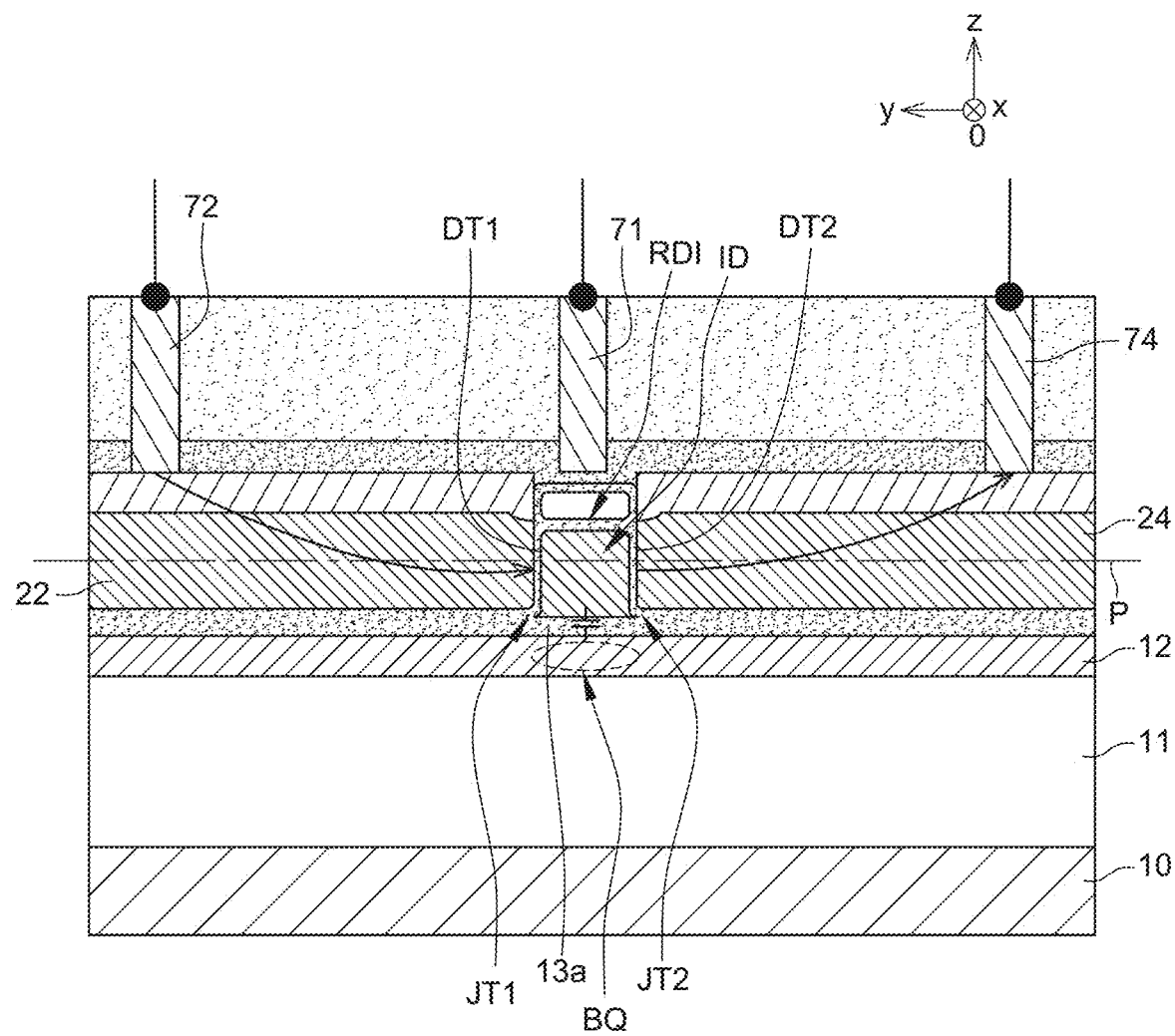
FIG. 1 shows schematically an example of a quantum device according to a first embodiment wherein each quantum dot is associated with a detection structure with Coulomb blockade disposed above and facing said quantum dot.

Reference is made first of all to FIG. 1, which gives an example embodiment of a quantum device according to a first embodiment.

In the particular example embodiment given on this figure, a quantum dot BQ is formed in a region of the semiconductor layer 12. This semiconductor layer 12 can be the surface layer of a substrate or of a layer attached or deposited on a substrate and formed from a semiconductor material or from several stacked semiconductor materials.

According to a particular embodiment, the semiconductor layer 12 is the surface layer of a substrate of the semiconductor on insulator type, in particular a layer of silicon of an SOI substrate (SOI standing for "Silicon On Insulator"), for example $^{28}$Si. According to another example embodiment, the semiconductor layer 12 can be formed by a heterostructure, for example SiGe/Si.

The quantum dot BQ provides the confinement of at least one elementary charge (electrons or holes). Preferably, the quantum dot BQ includes here a single elementary charge. The spin of this charge in particular an electron, can be provided for coding the quantum information. In this case, the qubit associated with the quantum dot BQ is a spin qubit.

To allow detection of the quantum dot BQ, a charge detection structure is provided in proximity and here above the quantum dot BQ. The operation of this charge detection structure is based on a capacitive coupling, also called "electrostatic coupling", between the quantum dot BQ and a detection island ID arranged above and facing the quantum dot BQ. The detection island ID is produced in a block, typically conductive or semiconductor, and separated from the quantum dot BQ by means of an insulating region 13a. This insulating region 13a may be a zone of an insulating layer covering the surface semiconductor layer 12. The composition of the insulating region 13a, for example made from silicon oxide, and the thickness of this insulating layer, for example between 2 nm and 20 nm, advantageously between 5 nm and 10 nm, are designed to allow coupling between the quantum dot BQ and a detection island ID. Such coupling depends on the capacitance between the detection island ID and the quantum dot BQ in terms of respective surfaces facing each other, on thickness of the insulating layer separating them and on dielectric constant of the insulated separating them. Such an arrangement of a superimposed quantum dot BQ and detection island ID makes it possible to minimise the distance between quantum dot and detector to guarantee good sensitivity of the detector.

The device is here provided with a first gate block 22 and a second gate block 24 located above the semiconductor layer 12 and on either side of the island ID. These gate blocks 22, 24 serve as a charge reservoir and also to adjust the potential of the quantum dot BQ. They are designed to be good conductors-including at the cryogenic temperatures of use of the device.

The first gate block 22 and the second gate block 24 are typically provided based on a doped semiconductor material such as for example polysilicon, or based on a conductive material such as for example TiN. The first gate block 22 is here located in the same plane P parallel to a principal plane of the substrate as the detection island ID, this plane P being disposed above the semiconductor layer 12 in which the quantum dot is arranged. Principal plane of the substrate means a plane passing through the substrate and parallel to the plane [O;x;y] of the orthogonal reference frame [O;x;y;z] given on FIG. 1.

The first gate block 22 and the second gate block 24 are separated from the semiconductor region 12a in which the quantum dot BQ is produced by at least one insulating layer.

The charge detection structure is a structure of the Coulomb blockade type here based on the passage of a current through the island ID facing the quantum dot BQ. Detection of this current gives information on the state of charge of this dot BQ.

The Coulomb blockade structure is provided with a first tunnel junction JT1 between the detection island ID disposed above and facing the quantum dot BQ and a portion of the first gate block 22 juxtaposed with the detection island ID. The first gate block 22 and the detection island ID are separated by means of a tunnel dielectric region DT1.

In this particular example embodiment, the second gate block 24 is juxtaposed with the detection island ID and located in the same plane P as the detection island ID and the first gate block 22, so that the detection island ID is disposed between the first gate block 22 and the second gate block 24. A second tunnel junction JT2 is provided between the detection island ID and the second gate block 24. The second gate block 24 and the detection island ID are separated by means of a tunnel dielectric region DT2. The Coulomb blockade structure thus has, in this particular example embodiment, operation similar to a single electron transistor (SET). The gate blocks 22, 24 can here be assimilated respectively to a source region and a drain region of the transistor. In this way the passage of a current from this SET transistor is controlled according to the respective potentials applied to the gate blocks 22, 24.

Conductive contact pads 72, 74 connected to the gate blocks 22, 24 are here preferably provided to make it possible to apply respective biasing potentials thereto. According to the biasing potentials respectively applied to the pad 72 and to the pad 74, a current (represented schematically by arrows) can be caused to circulate through the junctions JT1, JT2 and the detection island ID.

When the Coulomb blockade structure is not being used as a charge detector, in particular when the qubits stored in the quantum box is initialised, controlled or kept idle without reading a state of charge, the contact pads 72, 74, and consequently the gate blocks 22, 24, can be set to one and the same first potential $V_{G1}$. The SET transistor is then in an off operating mode so that circulation of current through the junctions JT1, JT2 is prevented.

This potential $V_{G1}$ is adjustable and can be fixed when the quantum dot BQ is initialised, so as to make it possible to impose a given state of charge on this quantum dot. Initialisation of the quantum dot BQ can then be implemented by means of the gate blocks 22, 24. The gate blocks on either side of the detection island ID are kept at the potential $V_{G1}$. The tunnel junctions allow passage of the charge and filling of the island ID until the potentials between gate blocks 22, 24 and the quantum island are balanced at a resolution of the order of a few mV or less, having no impact for adjustment of the potential of the quantum dot.

The gate blocks themselves have an influence and contribute to this adjustment in order optionally to go below the resolution imposed by the Coulomb blockade.

During a phase of use of the Coulomb blockade structure as charge detector, a difference in potentials $\Delta V_{SD}^{SET}$ is applied between the contact pads 72, 74. The contact pads 72, 74 and then set to respective distinct potentials $V_{G2}$ and $V_{G3}$ such that $V_{G3}-V_{G2}=\Delta V_{SD}^{SET}$ with $\Delta V_{SD}^{SET}\neq 0$, so as to allow passage of current (represented by two arrows on FIG. 1) through the Coulomb blockade structure.

According to a particular example embodiment, the respective potentials $V_{G2}$ and $V_{G3}$ applied to the gate blocks 22, 24 can be such that $V_{G2}=V_{G1}$ and $V_{G3}=V_{G1}+\Delta V_{SD}^{SET}$.

The value of the current resulting from this particular biasing depends, and consequently gives information, on the state of charge of the quantum dot BQ located facing and below the detection island ID. This current can be detected by means of a current detection circuit that is connected to the contact pads 72, 74.

An arbitrary voltage VG can be applied to the first contact pad 72 for example via a stage provided with a digital to analogue converter (DAC).

The current at the second contact pad 74 can be read by means of a TIA (Trans-Impedance Amplifier) circuit. So that this pad 74 is also biased at a controllable voltage, it is possible for example to use an additional digital to analogue converter (DAC) in order to adjust the reference voltage of the TIA circuit to this value.

Optionally and advantageously, the detection island ID can itself be controlled and coupled by electrostatic coupling to an additional pad 71 to confer an additional electrostatic control means. This conductive pad 71 is here disposed above and facing said detection island ID without being in contact therewith. The conductive pad 71 is separated from said detection island ID by means of at least one dielectric region RDI designed, in particular in terms of composition and thickness, so as to allow electrostatic coupling between said conductive pad 71 and said detection island ID. For example, the dielectric region RDI is formed from a dielectric material such as a silicon oxide with a thickness that can be between for example 5 and 15 nm.

According to a potential applied to the conductive pad 71, it is possible to adjust the chemical potential, in other words the Fermi level, of the Coulomb blockade structure. The conductive pad 71 thus offers an additional degree of adjustment for the detection structure. The voltage applied to this conductive pad 71 serves to control the chemical potential of the detection island. In other words, it makes it possible to adjust the discrete energy levels of the detection island ID with respect to the potential of the gate blocks 22, 24, and therefore to switch it from a Coulomb blockade mode to a non-blocked mode without having to modify the voltages applied to the gate blocks 22, 24.

Furthermore, modulating this voltage offers a means for finely controlling the potential of the quantum dot.

A variant (not shown) without this conductive pad 71 can however be provided. The electrostatic control of the detection island ID can then be implemented by means of the gate blocks 22, 24, which however removes a degree of freedom in the control of the detection structure and makes the biasing of the various elements more complex.

A variant embodiment of the quantum device as described previously is illustrated on FIG. 2. It differs from the example embodiment described previously in particular through the configuration of the semiconductor region in which the quantum dot BQ is provided. In the particular example embodiment given on this figure, the quantum dot BQ is thus formed in a semiconductor region that here does not extend over the entire surface of the substrate but over only part of the substrate. This semiconductor region can in particular be a region of an etched or transferred semiconductor block 120.

Figure 2:
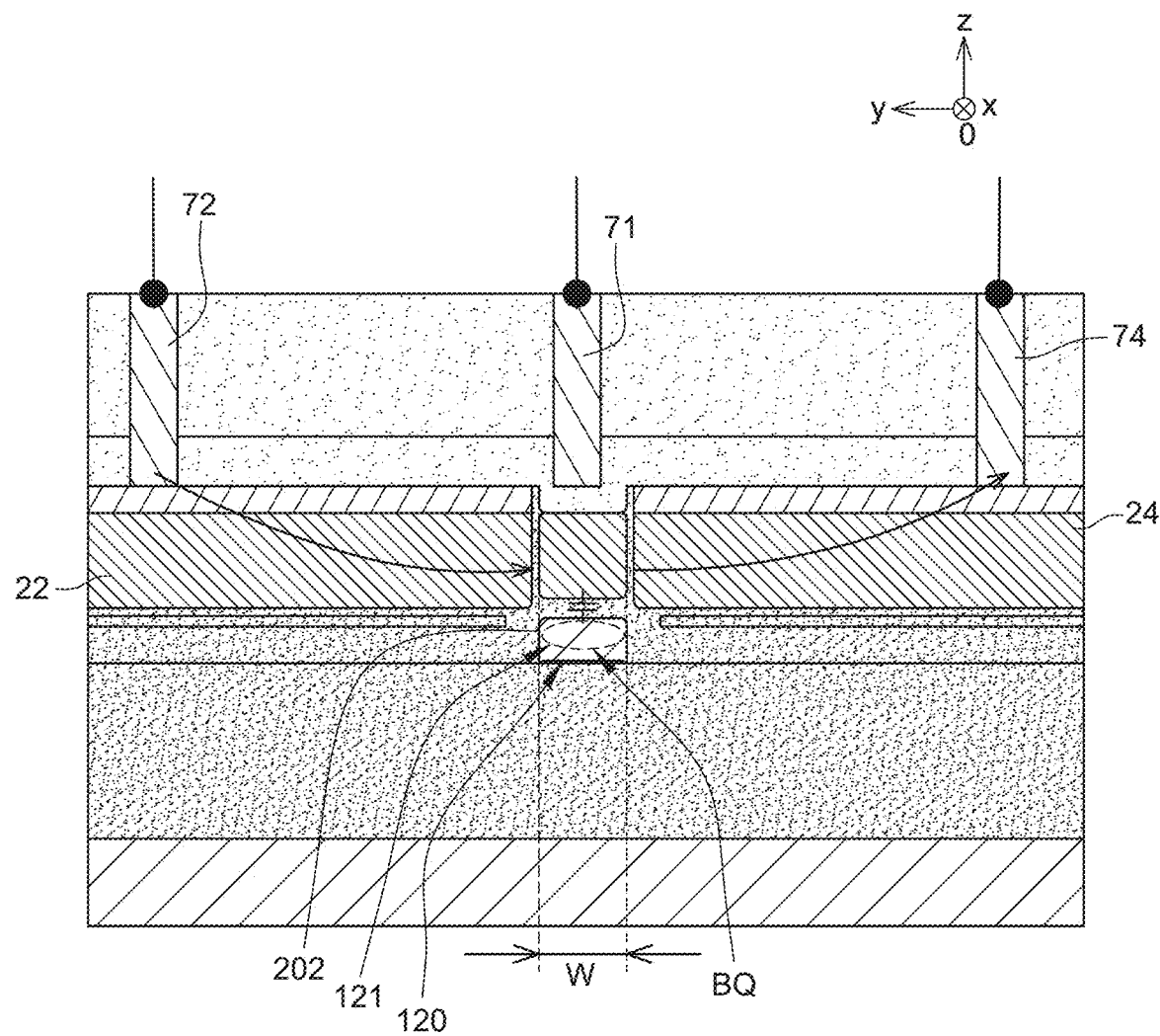
FIG. 2 shows schematically a variant embodiment of the quantum device for which each quantum dot is formed in a semiconductor block with a width of the same order as that of a detection island of said detection structure placed facing the dot.

The semiconductor block 120 can be provided with a width (the dimension measured parallel to the axis y of the orthogonal reference frame [O;x;y;z] given on FIG. 2) that is of the same order as the width of the detection island, preferably equal to or less than the width W of the detection island ID. The width of the block 120 accommodating the quantum dot BQ can be between for example 20 nm and 100 nm, advantageously between 20 nm and 40 nm. With such an arrangement, and by positioning the quantum dot BQ exactly vertically in line with the detection island ID, it is possible to maximise the detection sensitivity.

Advantageously, for this variant structure, a dielectric region 202 is provided against the lateral sides of the semiconductor region 12a that has a composition and/or dimensions different from that of the dielectric tunnel zones DT1, DT2 against the detection island ID and preferably designed to prevent a passage of current between the gate blocks and the quantum dot via the lateral sides.

A variant of the example embodiment described previously is illustrated on FIG. 3. The Coulomb blockade structure differs from those described previously here in particular in that it is provided with a single tunnel junction JT1 formed between the detection island ID and a first gate block 22 juxtaposed with the detection island ID. A single gate block 22 is then provided facing a first lateral side 301 of the detection island ID. In place of a second gate block, an insulating region 305 is here disposed against a second lateral side 302 of the island ID.

Detection of the state of charge of the quantum dot BQ can be implemented here by reflectometry. A conductive pad 72 designed to apply a biasing potential to the first gate block 22 is coupled to a circuit 350 of a reflectometry device configured to emit an RF signal SE on the contact pad 72 and to receive a reflected RF signal SR following the emission of the RF signal SE.

The RF signal SE is typically a high-frequency signal (for example between 100 MHz and 1 GHz) sent on the detection island ID. The RF signal reflected by this island ID is next demodulated by the circuit 350. An inductor 352 is used in order to create a resonator LC composed of this inductor 352 and which depends on a quantum capacitance Cq formed by the quantum dot BQ and the detection island ID. When the value of Cq varies, the phase and amplitude of the reflected signal vary, which can be detected by measurement means. It is thus possible to know the relative state of charge of the quantum dot BQ of the qubit intended to be read.

A circuit of a type as described for example in the document of R. J. Schoelkopf et al., Science, 280, 5367, pp. 1238-1242, 1998 can in a variant be used.

Optionally, and there again advantageously, a conductive pad 71 can be provided above and at a distance from the detection island ID. This conductive pad 71 is separated from the detection island ID by means of at least one dielectric region, and makes it possible to adjust the chemical potential of the Coulomb blockade structure by electrostatic coupling with the detection island ID.

When the Coulomb blockade structure is not being used as a charge detector, the contact pad 72 and consequently the gate block 22 can be maintained at an adjustable given potential.

During a phase of use of the Coulomb blockade structure as charge detector, an RF signal is applied to the contact pad 72. The amplitude of the reflected RF signal taken off the contact pads 72 provides information on the charge configuration of the island ID and therefore on its electrostatic environment.

Figure 3:
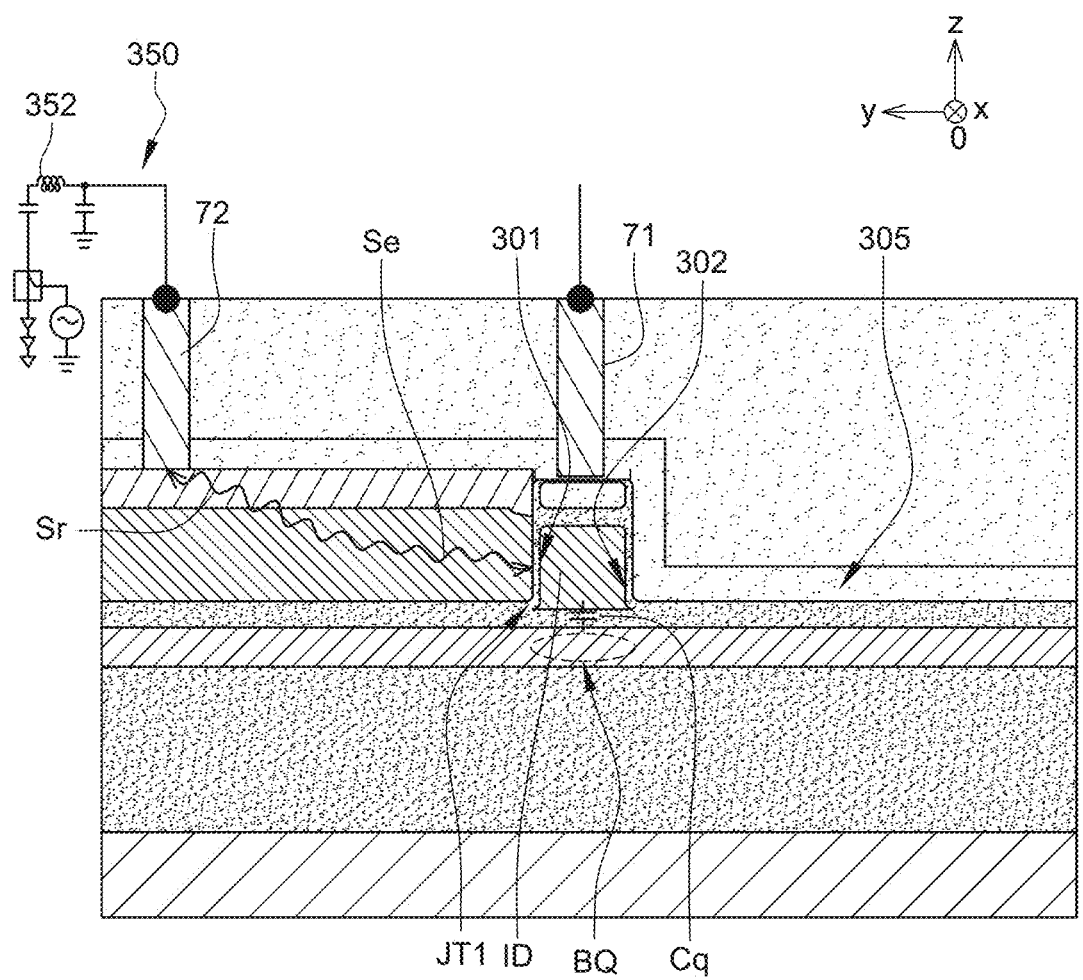
FIG. 3 shows schematically a variant implementation of the quantum device for which the detection structure is associated with a reflectometry measuring device.

In the example in FIG. 3, the quantum dot BQ is provided in a semiconductor layer that can extend over the entire substrate. There again, it is possible in a variant to make provision for producing this quantum dot in an etched or transferred semiconductor block the dimensions of which in particular in terms of width are substantially equal to or less than that of the island ID.

One or other of the quantum devices introduced above can include more than one quantum dot BQ. In reality, a quantum device according to the invention typically includes a plurality of qubits each formed by at least one quantum dot for storing the quantum information associated with a detection structure with Coulomb blockade disposed above. The quantum dots can thus be arranged in at least one row or even in a plurality of rows and in a matrix arrangement of quantum dots with a matrix arrangement corresponding to detection structures with Coulomb blockade.

An example of a method for producing a quantum device of a type described as above, and in particular in relation to FIG. 1, will now be given in relation to FIGS. 4 to 12A-12B.

Possible starting staring material (FIG. 4) for producing the device is here found in the form of a substrate 5 of the semiconductor on insulator type. The substrate 5 thus includes a so-called "support" layer 10 made from semiconductor material, an insulating layer 11 disposed on the support layer 11 and a semiconductor surface layer 12 disposed on the insulating layer. The substrate 5 is for example an SOI substrate the surface layer 12 of which is made from silicon. The semiconductor surface layer 12 is here intended to accommodate the quantum dots or dots. The substrate of the semiconductor on insulator type may in particular be a substrate of the SOI (standing for "Silicon On Insulator") type with a surface layer 12 of silicon, in particular $^{28}$Si when this layer has to accommodate electron spin qubits. The insulating layer 11 and the support layer 10 of the substrate are typically, respectively, a layer of silicon oxide commonly referred to as "BOX" (standing for "Buried Oxide") and a semiconductor layer, for example based on silicon. The thickness of the surface layer 12 is for example between 5 nm and 25 nm, typically of the order of 10 nm.

Next one or more detection islands are produced.

For this purpose, a stack covering the surface semiconductor layer 12 is formed. This stack comprises at least one insulating layer 13, advantageously based on a gate dielectric such as for example silicon oxide. An insulating layer 13 with a thickness for example of between 5 nm and 15 nm can be formed.

A so-called "high-k" dielectric, in other words with a high dielectric constant k such as for example $HfO_2$, can also be used to form this insulating layer 13.

The insulating layer 13 is surmounted by at least one layer 14 of semiconductor or conductive material, typically a gate material such as for example polysilicon with a thickness that may for example be between 20 nm and 50 nm. The layer 14 of semiconductor or conductive material is covered with at least one dielectric layer 15. A gate dielectric formed from a silicon oxide or a "high-k" dielectric such as for example $HfO_2$ can, there also, equally be used. The stack produced is next covered with at least one masking layer 17, in particular hard mask. Such a masking layer can be formed by at least one layer of insulating material, for example of SiN and/or of $SiO_2$. In the example embodiment illustrated, the masking layer is formed by a bilayer of SiN and $SiO_2$.

One or more patterns and in particular at least one pattern, in the particular example illustrated parallelepipedal, are next defined by etching in the masking layer 17 to form a masking block. This makes it possible next to transfer this pattern into the stack of underlying layers 14, 15. Anisotropic etchings and in particular using a plasma are thus implemented to produce the masking block, then a block with a corresponding appearance reproducing that of the masking block in the second dielectric layer 15 and the layer 14 of gate material.

Figure 6A:
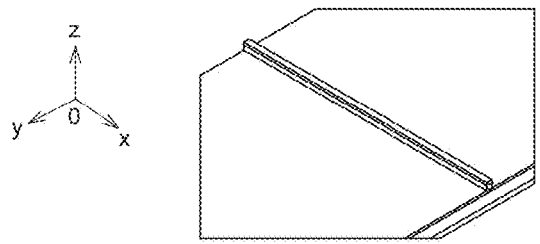
FIG. 5, FIG. 6A and FIG. 6B illustrate an embodiment of a conductive or semiconductor bar wherein one or more quantum dots are intended to be formed.
Figure 4:
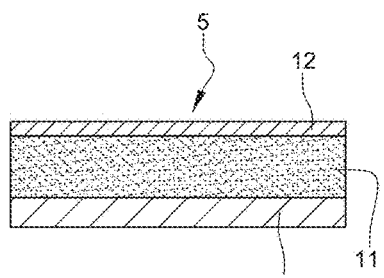
FIG. 4 illustrates an example of a possible starting substrate for implementing a quantum device according to the invention.
Figure 6B:
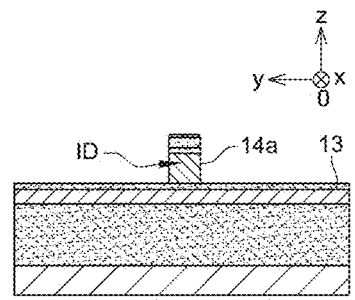

A structure that can be obtained at the end of this step as illustrated on FIGS. 6A, 6B, giving respectively a perspective view, a view in cross section along a cutting plane parallel to the plane [O;y;z] of an orthogonal reference frame [O;x;y;z]. The layer 14 forms after etching a block in the form of a bar 14a in which one or more detection islands ID is or are provided. In the particular example embodiment illustrated, the etching to form the block 14a is stopped on the first insulating layer 13. The insulating layer 13 can in this case be preserved so as to cover the entire surface layer 12.

A thin tunnel dielectric layer 19, the thickness of which, for example between 1 nm and 5 nm, depends on the material selected, is next deposited, in particular on the lateral sides of the bar 14a (FIG. 7). The dielectric 19 used can for example be $SiO_2$ or $HfO_2$ formed by deposition. In a variant, oxidation of the bar 14a can be implemented to make it possible to form a tunnel dielectric 19 on the lateral sides of the bar 14a.

Next gate blocks are formed on either side of the detection island or islands.

For this purpose, a layer of at least one conductive or semiconductor material 20, advantageously a gate material identical to that of the bar 14a, for example polysilicon, which may optionally be doped, is deposited first of all. The production of patterns in this layer can be preceded by a planarisation step CMP ("chemical mechanical planarisation") to next form a second masking on a preferably relief-free layer. This second masking can be formed by one or, as in the example embodiment illustrated in FIG. 8, a plurality of hard-mask layers 21, 23 in which one or more patterns, in particular orthogonal to the bar 14a, are next defined by etching.

Next an anisotropic etching of the layer of at least one conductive or semiconductor material 20 is implemented, typically by means of a plasma. In the particular example illustrated on FIGS. 9A-9B, the anisotropic etching of the layer of conductive or semiconductor material 20 protected by the masking 25 is continued until it reaches the dielectric layer 19 or the insulating layer 13. Gate blocks 22, 24 are thus formed on either side of a detection island ID.

These gate blocks 22, 24 extend mainly in a direction orthogonal to that of the bar 14a before it is etched. A first gate block 22 is disposed against a region of the tunnel dielectric layer 19 arranged on a lateral side of the detection island ID, so as to form a tunnel junction between the first gate block 22 and the detection island ID. A second gate block 24 is disposed against a region of the tunnel dielectric layer 19 arranged on an opposite lateral side of said detection island, so as to form a tunnel junction between the second gate block 24 and the detection island.

To form the contact pads 72, 74 on the gate blocks 22, 24, next one or more insulating layers can be formed in which holes are formed, the bottoms of which reach the gate blocks. Then these holes are filled by means of a conductive material, in particular a metal material such as for example W.

In the optional case where an additional conductive pad 71 is provided, coupled to the detection island ID, an additional hole is formed but the bottom of which is disposed at a distance from the block 14a accommodating the detection island ID. This additional hole can be formed concomitantly with the holes accommodating the contact pads 72, 74. This additional hole is then next filled with conductive material typically at the same time as the aforementioned accommodating holes.

To make it possible to promote contact between the gate blocks and the contact pads, provision can be made, optionally, to produce regions of metal and semiconductor alloy on the gate blocks 22, 24.

An example of production of these regions of metal and semiconductor alloy is given in relation to FIGS. 10, 11, 12A-12B.

In order to produce the alloy regions only on the top faces of the gate blocks, an encapsulation of the revealed lateral faces of these gate blocks 22, 24 can be provided in advance. Such encapsulation is illustrated for example on FIG. 10, where insulating spacers 47 are produced, for example by deposition and then etching of dielectric material, such as for example silicon nitride.

Next, as on FIG. 11, the masking 25, optionally preserved on the gate blocks 22, 24, can be removed to reveal their top faces 233. In the case illustrated, where a layer of nitride is to be removed at the top of the gate blocks, selectively with respect to a lateral encapsulation of $SiO_2$, a chemical etching based on $H_3PO_4$ can be used.

Then, as on FIGS. 12A-12B, the regions 51 based on metal and semiconductor alloy are formed on the top faces 233 of the gate blocks 22, 24 in order to form ohmic contacts thereon. A step of depositing at least one layer of metal, for example Ni, Pt, W, Co or Ti, can first of all for that purpose be implemented. Heat treatment is next carried out to implement the siliciding. Such a treatment can be implemented at a temperature of between for example 400° C. and 500° C. and of a duration adapted according to the treatment temperature. The temperature range depends greatly on the materials used and the alloy phase that it is wished to obtain.

A variant of a manufacturing method for implementing a quantum device of the type illustrated for example on FIG. 2 will now be given in relation to FIGS. 13 to 22.

A device is manufactured here in which the quantum dot or dots is or are confined in a block, also referred to as a semiconductor bar, that does not extend over the entire surface of the substrate.

The starting material may be the same substrate 5 as in the example embodiment previously described.

This substrate 5 can next be covered (FIG. 13) with a stack comprising the first insulating layer 13, the layer 14 of semiconductor or conductive material, and the masking layer 17.

Then a masking block 17a is defined in the masking layer 17 and the pattern of this masking is transferred into the stack of underlying layers 12, 13, 14. At least one anisotropic etching using a plasma is then implemented to reproduce the pattern of the masking block in the layer 14 of gate material. In this example embodiment, the insulating layer 13 and the surface semiconductor layer 12 of the substrate are also etched in order to reproduce the same pattern in the insulating 13 and semiconductor 12 layers.

A structure that can be obtained at the end of this step is shown on FIGS. 14A, 14B (giving respectively a perspective view and a view in cross section along the axis A'A). A so-called "upper" bar 140a is formed at the end of the etching of the layer 14. In this bar 140a a plurality of detection islands are provided. A so-called "lower" bar 120a is for its part located under the upper bar 140a and results from the etching of the surface semiconductor layer 12. In the particular example embodiment illustrated, the etching to form the upper bar 140a and the lower bar 120a is stopped on the insulating layer 11 of the substrate 5.

Lateral sides 121 of the semiconductor bar 120a are revealed at the end of this etching. In order to avoid the possibility of a passage of current between the future gate blocks and the bar 120a, insulating protective blocks are next formed on either side of the lateral sides 121 of the lower semiconductor bar 120a. An oxide deposited at high temperature (HTO "High Thermal Oxide") can be used.

Producing these insulating protective blocks can, as in the example embodiment illustrated on FIGS. 15A-15B, comprise the deposition of a first thin insulating layer 151, for example a thermal silicon oxide, with a thickness that can be between for example 5 nm and 20 nm. This deposition can be followed by the deposition of a thicker insulating layer 153, for example between 50 nm and 200 nm and based on $SiO_2$. The total thickness of the insulating layers 151, 153 can then be provided greater than the height of the stack covered by the masking layer 17. In this case, a planarisation (CMP) is then next typically implemented, stopping at the masking layer 17.

A partial removal of the insulating layers 151, 153 is then implemented (FIGS. 16A-16B) so as to remove these insulating layers 151, 153 around the upper bar 140a and to at least partly reveal lateral faces of this upper bar 140a, while preserving these insulating layers 151, 153 against the lateral flanks 121 of the lower bar 120a. The partial removal of the insulating layers 151, 153 can be implemented by wet etching, for example using HF.

A thin layer of tunnel dielectric 159, for example with a thickness of between 1 nm and 5 nm, is then next formed, by deposition on the lateral faces 141 of the upper bar 140a or by oxidation of the upper bar 14a. In the particular example embodiment illustrated on FIG. 17, the thin layer of tunnel dielectric 159 also covers the masking layer 17 located at the top of the stack of bars 120a, 140a. The thin layer of tunnel dielectric 159 can for example be based on silicon oxide and for example with a thickness of between 1 and 2 nm.

Figure 18:
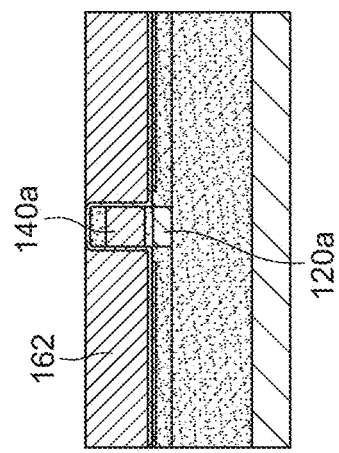

Next the gate blocks are formed on either side of the stack of superimposed lower 120a and upper 140a bars. For this purpose, a layer of conductive or semiconductor material 162, preferably a gate material identical to that of the upper bar 140a, such as for example polysilicon, is deposited first of all (FIG. 18). A CMP planarisation is next implemented in order to make the level reached by the conductive or semiconductor material 162 correspond to the top of the central stack in which the bars 120a, 140 are arranged.

Then a second masking 165 is formed. In a case where it is sought to produce a plurality of detection islands and a plurality of pairs of gate blocks, the second masking 165 is formed by several distinct blocks 165a, 165b, 165c, 165d parallel to each other and which here extend orthogonally to the principal direction of the superimposed bars 120a, 140a (said principal direction being a direction parallel to the x axis of the reference frame [O;x;y;z] given on the figures).

An etching of the layer 162 of gate material and of the bar 140a is next implemented in order to remove zones of the gate material 162 and of the bar 140a not protected by these blocks 165a, 165b, 165c, 165d of masking 165.

Figure 19A:
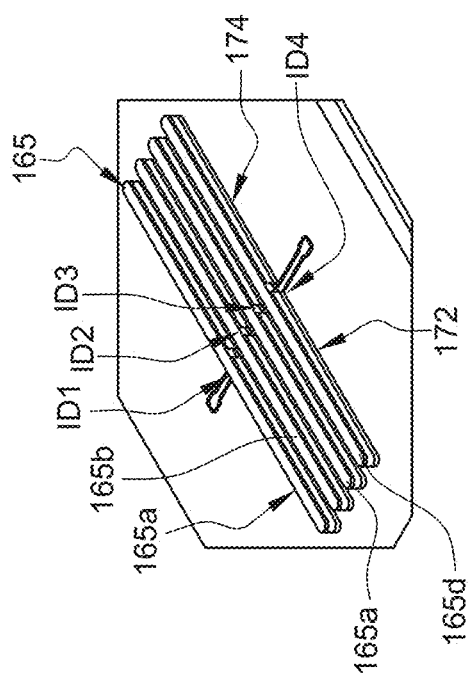
Figure 19B:
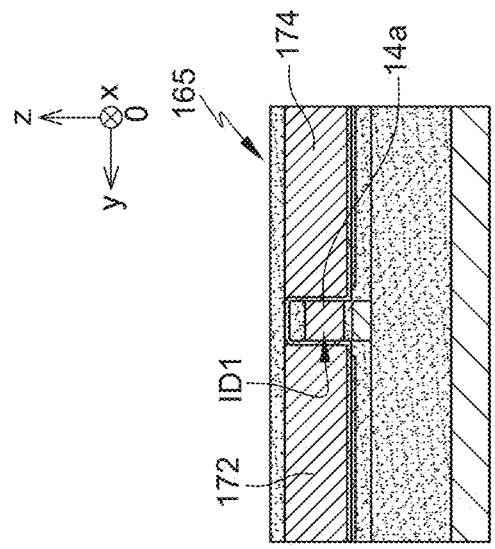

At the end of such etching, pairs of gate blocks 172, 174 are obtained as illustrated on FIGS. 19A-19B. Each pair of gate blocks is associated with and disposed on either side of an island ID1, ID2, ID3, ID4 formed by an etched portion of the upper bar 140a.

As with the example of a method described previously, there also, optional steps of forming an encapsulation or of insulating spacers 177 throughout on the lateral sides of the gate blocks (FIG. 20), of removal of the second masking 165 on the upper face 173 of these gate blocks (FIG. 21), and then of producing regions 185 of metal and semiconductor alloy, in particular silicide regions (FIG. 22) of the gate blocks in order to produce ohmic contacts, can be implemented.

Contact pads can next be formed to produce contacts on the gate blocks. Conductive pads facing and at a distance from the detection islands can be provided in order to produce a means of electrostatic control of the islands above the latter.

To implement a structure as described previously in relation to FIG. 3, where each detection island can be associated only with a single gate block, one or other of the methods described above is adapted by forming a masking 25 or 165 that extends only on a first side of the island in order next to be able to remove the material of the gate block or blocks on a second side of the island opposite to the first side. Steps of the method as described previously can then be followed.

Figure 5:
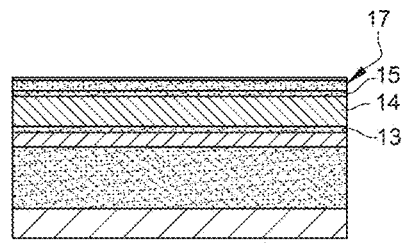
Figure 23:
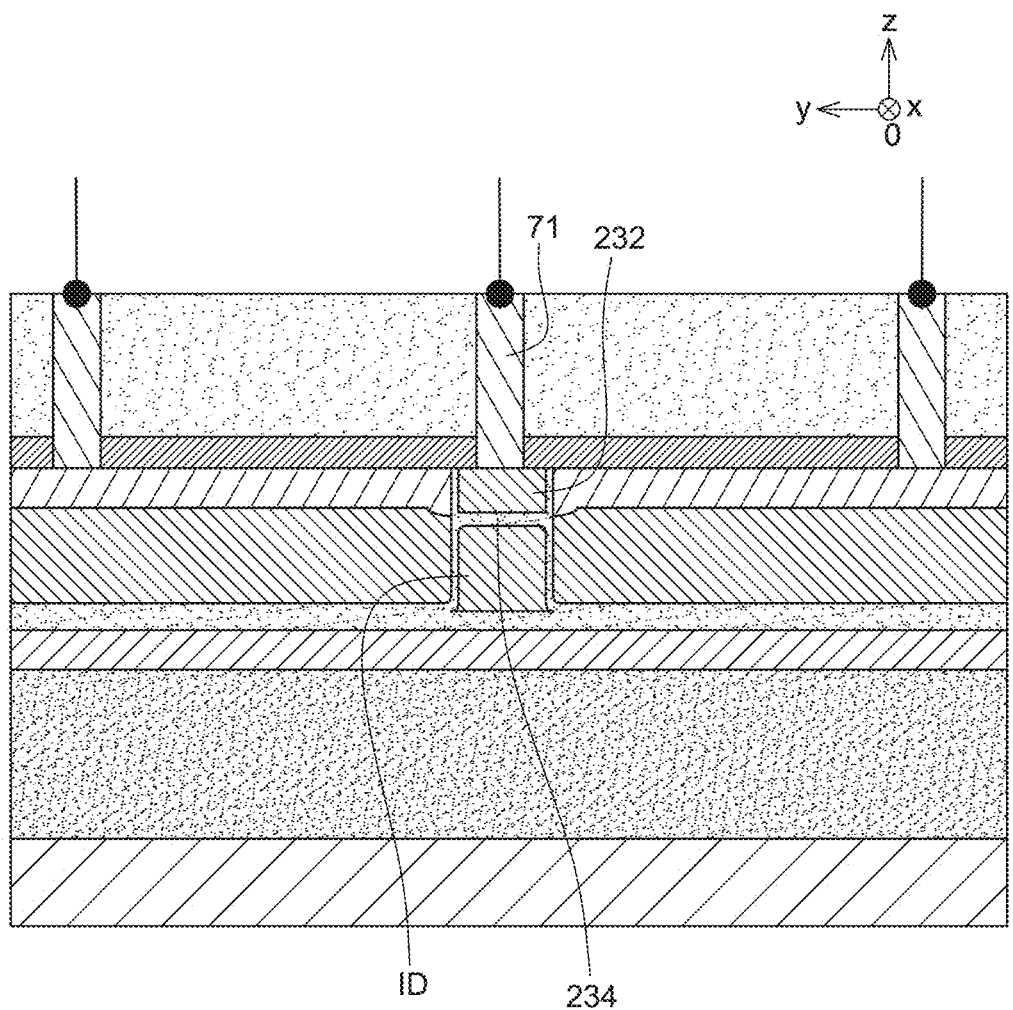
FIG. 23 illustrates a variant embodiment for which a bottom end of a pad for the electrostatic-coupling control of a detection island is arranged in contact with a conductive or semiconductor layer provided above the detection island and separated from the island by a dielectric region.

In another variant embodiment, illustrated in FIG. 23, provision is made for replacing the masking layer 17 formed on FIG. 5 and typically made from at least one insulating material and/or one commonly used for producing a hard mask, by a region 232 of conductive or semiconductor material. Advantageously, the material used to form the region 232 is a gate material that can be the same material as that used for forming the detection island ID, for example polysilicon. This makes it possible to achieve an improved contact with a conductive pad 71 that can be provided above the island ID and is intended to control it by electrostatic coupling. This can make it possible to have an insulating region 234 with better controlled dielectric properties and thus to be able to implement improved electrostatic coupling between the conductive pad 71 associated with the region 232 of conductive or semiconductor material and the detection island ID.

Advantageously, the region 232 of conductive or semiconductor material, the isolating region 234 and the detection island can be formed concomitantly by means of one and the same etching step and/or through one and the same masking in order to have substantially the same imprint and to reproduce the same pattern.

To implement a contact of the same type with a conductive pad 71 above and facing the island ID, another method makes provision for replacing the layer of material used for forming the island ID with a stack of a plurality of layers including a first conductive or semiconductor layer, for example made from polysilicon, an insulating layer on this first conductive a semiconductor layer, and a second conductive or semiconductor layer, preferably made from a material identical to that of the first conductive or semiconductor layer, for example polysilicon. A hard mask used for etching this stack can then be removed after implementing this etching and before forming the conductive pad 71. This conductive pad 71 is then typically formed by filling a hole formed in an insulating layer and which emerges on the second conductive or semiconductor layer.

The invention claimed is:

1. A quantum device formed on a substrate, the quantum device comprising:
   a first level in which a semiconductor region is arranged, a quantum dot being provided in the semiconductor region, and
   a second level in which a first gate block is arranged and configured to modulate a potential of the quantum dot formed in the semiconductor region,
   the second level further comprising a detection structure to detect a state of charge of the quantum dot, said detection structure including a detection island disposed above and facing the semiconductor region and coupled to the quantum dot by capacitive coupling,
   the first gate block being juxtaposed with said detection island,
   the detection island and the first gate block being separated by a dielectric region, and
   wherein the detection island, the dielectric region, and the first gate block form a first tunnel junction.

2. The quantum device according to claim 1, further comprising a second gate block distinct from the first gate block and located in a same first plane as the first gate block and the detection island, the first plane being parallel to a principal plane of the substrate,
   the second gate block being arranged so that the detection island is disposed between the first gate block and the second gate block,
   the detection island and the second gate block being separated by another dielectric region,
   wherein the detection island, the another dielectric region, and the second gate block form a second tunnel junction.

3. The quantum device according to claim 2, further comprising a first contact pad on the first gate block and a second contact pad on the second gate block.

4. The quantum device according to claim 2, wherein the first contact pad and the second contact pad are coupled to a current-measuring stage through the first tunnel junction and the second tunnel junction.

5. The quantum device according to claim 1, further comprising a first contact pad on the first gate block, the first contact pad being coupled to a circuit of a refractometry measuring device, said circuit being configured to:
   emit an RF signal on the first contact pad for said detection island; and
   detect a variation in impedance by a change in an amplitude or a phase of the RF signal reflected by said detection island.

6. The quantum device according to claim 1, wherein the detection structure is provided with a conductive pad for electrostatic control of said detection island, said conductive pad being disposed above and facing said detection island and separated from said detection island by at least one dielectric region so as to allow electrostatic coupling between said conductive pad and said detection island.

7. The quantum device according to claim 6, wherein the conductive pad is disposed in contact with a region of a conductive or semiconductor material separated from the detection island by a particular dielectric region,
   said region of the conductive or semiconductor material, said particular dielectric region, and said detection island having a same imprint and forming a same pattern.

8. The quantum device according to claim 1, wherein the detection island contains a same conducting material or a same doped semiconductor material as the first gate block.

9. The quantum device according to claim 1, wherein said dielectric region separating the detection island and the first gate block has a thickness between 1 and 5 nm.

10. The quantum device according to claim 1, wherein the detection island is formed in an upper rod, the upper rod being made of conducting material or doped semiconductor material, the dielectric region being formed on a first lateral sidewall of the upper rod, and wherein the semiconductor region is formed in a lower rod.

11. The quantum device according to claim 9, the first insulating block having a composition and dimensions configured to prevent current flow between the first gate block and the semiconductor region via lateral sidewalls.

12. The quantum device according to claim 1, wherein the first gate block is formed of a conducting material or a doped semiconductor material and forming a reservoir of charges for the detection island when the first tunnel junction is biased so as to allow charge transfer between the first gate and the detection island.

13. A quantum device formed on a substrate, the quantum device comprising:
   a first level in which a semiconductor region is arranged, a quantum dot being provided in the semiconductor region, and
   a second level in which a first gate block is arranged and configured to modulate a potential of the quantum dot formed in the semiconductor region,
   the second level further comprising a detection structure to detect a state of charge of the quantum dot, said detection structure including a detection island disposed above and facing the semiconductor region and coupled to the quantum dot by capacitive coupling,
   the first gate block being juxtaposed with said detection island,
   the detection island and the first gate block being separated by a dielectric region,
   wherein the detection island, the dielectric region, and the first gate block form a first tunnel junction, and
   wherein the first gate block is configured to form a reservoir of charges for the detection island when the first tunnel junction is biased.

14. A method of operating the quantum device according to claim 3, comprising:
   during a detection operating phase, apply respectively a first potential to the first gate block and a second potential, different from the first potential, to the second gate block, so as to allow passage of a current through said first and second tunnel junctions, and
   during at least one other operating phase distinct from said detection operating phase, apply a same given potential to the first gate block and to the second gate block.

15. A method for manufacturing the quantum device according to claim 1, the method comprising:
   providing the substrate covered with a semiconductor layer provided with the semiconductor region in which the quantum dot is to be formed,
   forming a bar based on at least one conductive or semiconductor material in which the detection island facing said quantum dot is provided,
   forming the dielectric region on at least one lateral side of said bar, and
   forming one or more gate blocks juxtaposed with said bar and extending mainly in a direction orthogonal to a principal direction in which said bar extends, the first gate block from said one or more gate blocks being disposed against the dielectric region arranged on said detection island, so that the detection island, the dielectric region, and the first gate block form the first tunnel junction.

16. The method according to claim 15, wherein said one or more gate blocks are formed by:
   depositing a gate material, and
   etching said gate material, said etching being implemented concomitantly with an etching of the bar to form the detection island.

17. The method according to claim 16, said bar being based on said gate material.

18. The method according to claim 16, wherein the dielectric region is formed by depositing a tunnel dielectric layer on the bar and then by etching the tunnel dielectric layer, the etching of the tunnel dielectric layer and the etching of said bar to form the detection island and the etching of said gate material being implemented using a same masking.

19. The method according to claim 15, wherein the tunnel dielectric region is formed by oxidizing said bar.

20. The method according to claim 15, wherein said bar is an upper bar and is formed by depositing a conductive material and then etching the conductive material using a masking, said etching of the conductive material being extended into the semiconductor layer so as to form a lower bar.

21. The method according to claim 20, wherein, at an end of said etching so as to form said lower bar, lateral sides of the lower bar are revealed, the method further comprising, after forming said lower bar and prior to the formation of said tunnel dielectric region, steps of:
   depositing one or more insulating layers,
   etching said one or more insulating layers so as to form insulating protective blocks on either side of lateral faces of the semiconductor region, and
   the dielectric region by depositing a tunnel dielectric layer on the upper bar while lateral sides of the lower bar are protected.

* * * * *